United States Patent
Oyama et al.

(10) Patent No.: US 9,697,858 B2
(45) Date of Patent: Jul. 4, 2017

(54) PERPENDICULAR MAGNETIC RECORDING MEDIUM

(71) Applicant: FUJI ELECTRIC (MALAYSIA) SDN, BHD., Kulim, Kedah Darul Aman (MY)

(72) Inventors: Hirohisa Oyama, Kulim (MY); Kenichiro Soma, Matsumoto (JP); Isamu Sugai, Matsumoto (JP)

(73) Assignee: FUJI ELECTRIC (MALAYSIA) SDN, BHD., Kulim, Kedah Darul Aman (MY)

( * ) Notice: Subject to any disclaimer, the term of this patent is extended or adjusted under 35 U.S.C. 154(b) by 0 days.

(21) Appl. No.: 14/627,720

(22) Filed: Feb. 20, 2015

(65) Prior Publication Data
US 2015/0162043 A1    Jun. 11, 2015

Related U.S. Application Data (63) Continuation of application No. PCT/MY2012/000261, filed on Oct. 8, 2012.

(51) Int. Cl.
*G11B 5/66* (2006.01)
*G11B 5/667* (2006.01)
(Continued)

(52) U.S. Cl.
CPC ............... *G11B 5/667* (2013.01); *G11B 5/65* (2013.01); *G11B 5/656* (2013.01); *G11B 5/738* (2013.01); *G11B 5/7325* (2013.01)

(58) Field of Classification Search
CPC ..................................................... G11B 5/667
See application file for complete search history.

(56) References Cited

U.S. PATENT DOCUMENTS

| 5,543,221 A | 8/1996 | Kitakami et al. |
| 2006/0093867 A1 | 5/2006 | Takenoiri et al. |

(Continued)

FOREIGN PATENT DOCUMENTS

| EP | 0 309 202 A2 | 3/1989 |
| JP | 5-82653 B2 | 11/1993 |

(Continued)

OTHER PUBLICATIONS

International Search Report issued in PCT/MY2012/000261, dated Aug. 1, 2013. English translation provided.

*Primary Examiner* — Holly Rickman
(74) *Attorney, Agent, or Firm* — Rossi, Kimms & McDowell LLP (57) ABSTRACT

A perpendicular magnetic recording medium is disclosed in which crystal axis orientation dispersion, crystal grain diameter, and crystal grain diameter dispersion in a magnetic recording layer are reduced. The perpendicular magnetic recording medium has a structure having, stacked sequentially on a non-magnetic substrate, at least an amorphous underlayer, a lower orientation control layer made of Ru or Ru alloy of an hcp structure, an upper orientation control layer that is made of alloy containing an element selected from the group consisting of Co and Ni and an element selected from the group consisting of Cr, W, and Mo and that has an fcc or hcp structure, an intermediate layer, and a magnetic recording layer.

16 Claims, 1 Drawing Sheet

(51) Int. Cl.
*G11B 5/73* (2006.01)
*G11B 5/65* (2006.01)
*G11B 5/738* (2006.01)

(56) References Cited

U.S. PATENT DOCUMENTS

| | | |
|---|---|---|
| 2006/0291100 A1* | 12/2006 | Lu et al. ................ 360/135 |
| 2007/0207348 A1 | 9/2007 | Mukai |
| 2008/0062561 A1* | 3/2008 | Shi et al. ............... 360/135 |
| 2008/0096055 A1 | 4/2008 | Takenoiri et al. |
| 2009/0226764 A1* | 9/2009 | Srinivasan et al. ........ 428/846 |
| 2010/0021768 A1 | 1/2010 | Sonobe et al. |
| 2010/0215991 A1 | 8/2010 | Kurokawa et al. |
| 2010/0233516 A1* | 9/2010 | Kong et al. ............ 428/846.6 |
| 2012/0288735 A1 | 11/2012 | Hozumi |
| 2014/0093746 A1* | 4/2014 | Zambano et al. ........ 428/828 |

FOREIGN PATENT DOCUMENTS

| | | | |
|---|---|---|---|
| JP | 2006-120231 | A | 5/2006 |
| JP | 2007-234164 | A | 9/2007 |
| JP | 2008-117506 | A | 5/2008 |
| JP | 2009-032356 | A | 2/2009 |
| JP | 2012-238360 | A | 12/2012 |

* cited by examiner

PERPENDICULAR MAGNETIC RECORDING MEDIUM

BACKGROUND OF THE INVENTION

A. Field of the Invention

The present invention relates to a perpendicular magnetic recording medium for use in a hard disk drive.

B. Description of the Related Art

In a perpendicular magnetic recording medium, mainly a Co—Pt-based alloy is used as a material of a magnetic recording layer for recording data. The Co—Pt-based alloy has a hexagonal close-packed (hcp) structure and shows uniaxial anisotropy in a c-axis direction thereof. The hcp c-axis of the Co—Pt-based alloy needs to be oriented in a direction perpendicular to a principal plane of the magnetic recording medium (disk surface) in order to perform perpendicular magnetic recording. Furthermore, crystal axis orientation dispersion of the Co—Pt-based alloy forming the magnetic recording layer needs to be reduced as much as possible in order to improve the signal-to-noise ratio (SNR) of the magnetic recording medium. In addition, the crystal grain diameter of magnetic crystal grains (magnetic particles) of the Co—Pt-based alloy and dispersion in the grain diameter of the magnetic crystal grains needs to be reduced in order to reduce noise and obtain a favorable SNR. These requirements apply not only to the Co—Pt-based alloy mentioned above, but also to other materials of magnetic recording layers. In the magnetic recording layers made of other magnetic recording materials as well, not only is it necessary to reduce crystal axis orientation dispersion of each magnetic recording layer as much as possible, but also the crystal grain diameter of magnetic crystal grains (magnetic particles) and dispersion of the magnetic crystal grains need to be reduced.

Generally, a plurality of underlying layers are formed under a magnetic recording layer in order to control the orientation and grain diameter of crystal grains of the magnetic recording layer. The underlying layers include (1) an amorphous underlayer having an amorphous structure or microcrystalline structure, (2) an orientation control layer made of NiCr alloy, NiMo alloy, NiW alloy or the like having a face-centered cubic lattice (fcc) structure and for controlling a crystal plane to be grown, and (3) an intermediate layer made of Ru or Ru alloy and assisting in reduction of the number of crystal defects and formation of a high-quality magnetic recording layer. Moreover, as a way to reduce the film thickness of the intermediate layer and the usage of the expensive Ru or Ru alloy, a layer made of Cr or CoCr alloy is often formed between the orientation control layer and the intermediate layer.

For instance, for the purpose of not only reducing crystal axis orientation dispersion of a magnetic recording layer, but also microfabricating the crystal grains and reducing the film thickness of a non-magnetic intermediate layer, the use of the following stacking structure has been proposed as the underslab for forming the magnetic recording layer, the stacking structure being configured by: a first soft magnetic underlayer of an fcc structure that contains Ni and Fe; a first non-magnetic intermediate layer made of Ru and the like; a second soft magnetic underlayer of an fcc structure that contains Co; and a second non-magnetic intermediate layer made of Ru or Ru alloy (see Japanese Patent Application Publication No. 2008-117506). In this proposal, in addition to Co, the second soft magnetic underlayer can contain one or a plurality of types of elements selected from the group consisting of Fe, B, Al, Zr, Mg and Si.

Alternatively, for the purpose of improving the crystal orientation of a magnetic recording layer and microfabricating the crystal grains of the same, the use of the following stacking structure has been proposed as the underslab for forming the magnetic recording layer, the stacking structure being configured by: a seed layer of an hcp structure oriented to (002); a first intermediate layer of a body-centered cubic lattice (bcc) structure oriented to (110); and a second intermediate layer of an hcp structure orientated to (002)(see Japanese Patent Application Publication No. 2009-032356). In this proposal, the first intermediate layer preferably contains Cr of 60 atomic % or more. The first intermediate layer can further contain such elements as Ni and Co.

In addition, for the purpose of reducing the film thickness of an intermediate layer, the use of the following stacking structure has been proposed as the underslab for forming a magnetic recording layer, the stacking structure being configured by: a soft magnetic underlayer of an fcc structure that contains Co, Ni, and Fe; and a non-magnetic intermediate layer containing at least one element selected from the group consisting of Ru, Re, Pd, Ir, Pt, and Rh (see Japanese Patent Application Publication No. 2006-120231).

The present invention is directed to overcoming or at least reducing the effects of one or more of the problems set forth above.

SUMMARY OF THE INVENTION

Due to the improvement in the recording density of a magnetic recording medium, further reduction of crystal axis orientation dispersion in a magnetic recording layer thereof, the crystal grain diameter, and crystal grain diameter dispersion, are required. In order to accomplish this, the functionality of an underlying layer for forming the magnetic recording layer needs to be improved. The present invention provides a new configuration for such an underlying layer in order to form a magnetic recording layer which has a crystal condition which is more favorable in terms of electromagnetic conversion characteristics.

A magnetic recording medium according to the present invention is a magnetic recording medium in which at least an underlayer, a lower orientation control layer, an upper orientation control layer, an intermediate layer, and a magnetic recording layer are stacked sequentially on a non-magnetic substrate. The underlayer has an amorphous single-layer structure or a stacking structure configured by a plurality of layers in which at least a layer, out of the plurality of layers, that is in contact with the lower orientation control layer on the non-magnetic substrate side is amorphous. The lower orientation control layer is made of Ru or Ru alloy of an hcp structure. The upper orientation control layer is made of an alloy that contains an element selected from the group consisting of Co and Ni and an element selected from the group consisting of Cr, W, and Mo. The upper orientation control layer has an fcc structure or hcp structure. The underlayer and the upper orientation control layer may have soft magnetism and be magnetically coupled to each other by the lower orientation control layer. The lower orientation control layer may have a film thickness of 0.3 nm to 2.5 nm. The upper orientation control layer may have a film thickness of 2.0 nm to 12.0 nm. The intermediate layer may be configured by Ru or Ru alloy. The magnetic recording layer may be configured by Co alloy.

Adopting the configurations described above can further microfabricate the crystal grains of the magnetic recording layer without deteriorating the crystal orientation of the magnetic recording layer (without intensifying the crystal axis orientation dispersion). The magnetic recording medium of the present invention can cope with a higher memory density.

BRIEF DESCRIPTION OF THE DRAWINGS

The foregoing advantages and features of the invention will become apparent upon reference to the following detailed description and the sole FIGURE of drawing, which is a cross-sectional diagram showing a configuration example of a magnetic recording medium of the present invention.

DETAILED DESCRIPTION OF SPECIFIC EMBODIMENTS

Figure 1:
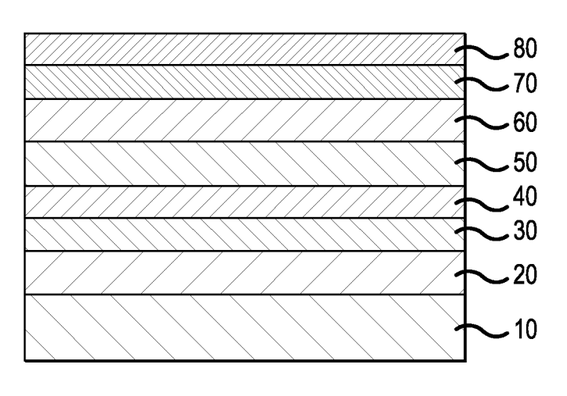

A magnetic recording medium according to the present invention has a structure in which at least an underlayer, a lower orientation control layer, an upper orientation control layer, an intermediate layer, and a magnetic recording layer are stacked sequentially on a non-magnetic substrate. The magnetic recording medium of the present invention may optionally include a protective layer and/or a fluid lubrication layer, on the magnetic recording layer. The FIGURE of drawing shows a configuration example of the magnetic recording medium of the present invention. In the configuration example shown in the FIGURE, the magnetic recording medium of the present invention includes a non-magnetic substrate 10, underlayer 20, lower orientation control layer 30, upper orientation control layer 40, intermediate layer 50, magnetic recording layer 60, protective layer 70, and fluid lubrication layer 80. Each of the components configuring the magnetic recording medium of the present invention may be formed as a single layer or have a stacking structure having a plurality of layers.

The non-magnetic substrate 10 can be formed using any materials that are known in the art, such as aluminum alloy, glass, and ceramic. When forming non-magnetic substrate 10 using aluminum alloy, it is preferred to plate a surface of the aluminum alloy with NiP in order to ensure hardness of the non-magnetic substrate 10.

The underlayer 20 functions to protect each of the constituent layers thereon from contamination on the surface of the non-magnetic substrate 10 and to improve smoothness of each constituent layer. With these functions of the underlayer 20, the crystals of each of the constituent layers that are formed on the underlayer 20 can grow more uniformly. When forming the underlayer 20 as a single layer, it is preferred that the underlayer 20 be formed with an amorphous material. When forming the underlayer 20 by stacking a plurality of layers, it is preferred that at least a layer out of the layers configuring the underlayer 20 that is in contact with the lower orientation control layer 30 on the substrate side be amorphous.

It is also preferred that the underlayer 20 have soft magnetism. When forming the underlayer 20 by stacking a plurality of layers, it is preferred that at least one of the layers have soft magnetism. In general, a soft magnetic alloy has high magnetic permeability, making it easy for a magnetic flux applied from a main pole of a recording magnetic head to return to a return pole. In other words, the underlayer 20 with soft magnetism becomes a part of a magnetic circuit in which a magnetic flux leaves a main pole thereof and returns to a return pole. Drawing the magnetic flux generated by the main pole into the underlayer 20 can improve the efficiency of applying a perpendicular magnetic flux to the magnetic recording layer 60.

A soft magnetic material used for forming the underlayer 20 includes an alloy containing magnetic metal such as Co, Fe, and Ni and an element with high amorphous structure forming ability, such as Zr, Ta, Nb, Ti, Mo, W, Si, and B. The underlayer 20 can be formed by any technology known in the art. In terms of the quality level of the underlayer 20 to be obtained, easiness of controlling the film thickness thereof, and high speed of forming the underlayer 20, it is preferred that the underlayer 20 be formed using a DC magnetron sputtering method.

The film thickness of the underlayer 20 is arranged depending on the density of the magnetic flux generated by the recording magnetic head. Generally, the underlayer 20 has a film thickness of approximately 10 to 50 nm.

Alternatively, the underlayer 20 may have a three-layer structure of first soft magnetic alloy layer/non-magnetic alloy layer/second soft magnetic alloy layer. The non-magnetic alloy layer can be formed using Ru, Ru alloy, and the like. Furthermore, it is preferred that the non-magnetic alloy layer have a film thickness of approximately 0.3 to 2.0 nm. This structure is effective in preventing noise (spike noise) caused by magnetic domains generated in the first and second soft magnetic alloy layers.

The lower orientation control layer 30 is a layer for controlling the crystal grain diameter and crystal orientation of the magnetic recording layer 60. Ni alloy has conventionally been used in order to control the crystal grain diameter and crystal orientation of the magnetic recording layer 60. On the other hand, the lower orientation control layer 30 of the present invention is configured by Ru or Ru alloy of an hcp structure. The Ru alloy contains Ru and an element selected from the group consisting of Co, Cr, Mo, W, Ni, Fe, Mn, Pt, Rh, and Ir. The lower orientation control layer 30 can be formed using any technology known in the art. In terms of the quality level of the lower orientation control layer 30 to be obtained, easiness of controlling the film thickness thereof, and high speed of forming the lower orientation control layer 30, it is preferred that the lower orientation control layer 30 be formed using the DC magnetron sputtering method.

Compared to the Ni alloy, Ru and Ru alloy with an hcp structure have higher surface energy. Therefore, the lower orientation control layer 30 of the present invention is considered to have low wettability to the underlayer 20. Due to the low wettability, the crystals of the lower orientation control layer 30 can be microfabricated (the crystal grain diameter can be reduced), resulting in a reduction of the crystal grain diameter in the magnetic recording layer 60. The conventionally used Ni alloy has an fcc structure, wherein a plane (111) of the fcc structure is preferentially oriented. On the other hand, the Ru and Ru alloy used in the present invention have an hcp structure, wherein a plane (002) of the hcp structure is preferentially oriented. However, it is known that the plane (111) of the fcc structure is equivalent to the plane (002) of the hcp structure, and there is no difference between these planes in terms of the orientations of the crystals in the layers formed on the lower orientation control layer 30.

Increasing the film thickness of the lower orientation control layer 30 can improve the crystal orientations of the lower orientation control layer 30 and of the layer formed on the lower orientation control layer 30. However, increasing the film thickness leads to enlargement of the crystal grains of the lower orientation control layer 30 (i.e., increase in the crystal grain diameter) and enlargement of the crystal grains in the layer formed on the lower orientation control layer 30. Therefore, the film thickness of the lower orientation control layer 30 is determined based on the balance between the effects of the improved crystal orientations and prevention of the enlargement of the crystal grains. In order to accomplish this balance, it is generally preferred that the film thickness of the lower orientation control layer 30 made of Ru or Ru alloy of an hcp structure be approximately 0.3 nm to 3.0 nm or more preferably approximately 0.3 nm to 2.5 nm.

The upper orientation control layer 40 is a layer for controlling the crystal orientation in the layer formed thereon. The upper orientation control layer 40 is also a layer for preventing enlargement of the crystal grains in the layer formed thereon, by introducing strain caused by a lattice mismatch between the upper orientation control layer 40 and the lower orientation control layer 30 and a lattice mismatch between the upper orientation control layer 40 and the intermediate layer 50. A material for forming the upper orientation control layer 40 includes alloy that contains an element selected from the group consisting of Co and Ni and an element selected from the group consisting of Cr, W, and Mo. In terms of the quality level of the upper orientation control layer 40, easiness of controlling the film thickness thereof, and high speed of forming the upper orientation control layer 40, it is preferred that the upper orientation control layer 40 be formed using the DC magnetron sputtering method.

In order to control the crystal orientation of the upper orientation control layer 40, it is preferred that the upper orientation control layer 40 has a crystal plane that is equivalent to the plane (002) of an hcp structure, which is a preferentially oriented plane of the lower orientation control layer 30. From this perspective, it is preferred that the upper orientation control layer 40 be formed using alloy of an hcp structure or an fcc structure. When the alloy has Ni as the main component, the upper orientation control layer 40 has an fcc structure. Because the fcc structure has a high crystal symmetry and a large number of equivalent crystal planes, there is a possibility that a crystal growth direction changes during the formation of the upper orientation control layer 40. The addition of Cr, W, or Mo lowers the crystal symmetry of the main component, Ni, and limits the crystal growth direction to one direction. As a result, the crystal orientation of the upper orientation control layer 40 is controlled by the addition of Cr, W, and Mo. However, when the alloy has Co as the main component, the upper orientation control layer 40 can have both the hcp structure and the fcc structure. In this case, the addition of Cr, W, or Mo stabilizes the hcp structure and prevents the growth of the fcc structure. As a result, the addition of Cr, W, and Mo limits the crystal growth direction to one direction, controlling the crystal orientation of the upper orientation control layer 40.

Moreover, W and Mo have larger atomic radii than Co and Ni. For this reason, the lattice mismatch between the upper orientation control layer 40 and the lower orientation control layer 30 and the lattice mismatch between the upper orientation control layer 40 and the intermediate layer 50 can be set appropriately by adjusting the amount of W or Mo to be added.

Increasing the film thickness of the upper orientation control layer 40 can improve the crystal orientations of the upper orientation control layer 40 and of the layer formed on the upper orientation control layer 40. However, increasing the film thickness leads to enlargement of the crystal grains in the upper orientation control layer 40 (i.e., increase in the crystal grain diameter) and enlargement of the crystal grains of the layer formed on the upper orientation control layer 40.

Therefore, the film thickness of the upper orientation control layer 40 is determined based on the balance between the effects of the improved crystal orientations and prevention of the enlargement of the crystal grains. In order to accomplish this balance, it is generally preferred that the film thickness of the upper orientation control layer 40 be approximately 2.0 nm to 12.0 nm.

In addition, it is preferred that the upper orientation control layer 40 have soft magnetism. The electromagnetic conversion characteristics (especially the overwrite properties) of the magnetic recording medium can be improved by combining the soft magnetic upper orientation control layer 40 and the soft magnetic underlayer 20. As described above, the underlayer 20 made of a soft magnetic material functions to draw the magnetic flux generated by the magnetic head during a recording process and increase the perpendicular magnetic flux applied to the magnetic recording layer 60. This function depends on a gap in the magnetic circuit between the main pole of the magnetic head and the soft magnetic material layer. The wider the gap in the magnetic circuit, the more the function deteriorates, resulting in a reduction of the perpendicular magnetic flux applied to the magnetic recording layer 60. The gap in the magnetic circuit is equivalent to the distance between the magnetic head (main pole) and the soft magnetic material layer, i.e., a sum of (1) the distance between the magnetic head and the surface of the magnetic recording medium and (2) a total film thickness of the layers between the magnetic head and the soft magnetic material layer. Therefore, forming the upper orientation control layer 40 between the magnetic head and the underlayer 20 by using the soft magnetic material having a high magnetic permeability is equivalent to reducing the gap in the magnetic circuit by the film thickness of the lower orientation control layer 30 and the film thickness of the upper orientation control layer 40. Consequently, the perpendicular magnetic flux applied to the magnetic recording layer 60 can be increased. Nonetheless, simply inserting a layer made of a soft magnetic material between the magnetic head and the underlayer 20 might cause a reduction in the signal-to-noise ratio (SNR) of the magnetic recording medium. This is because magnetization of the soft magnetic material is read as noise. On the other hand, in the configuration of the present invention in which the non-magnetic lower orientation control layer 30 is disposed between the soft magnetic underlayer 20 and the soft magnetic upper orientation control layer 40, the underlayer 20 and the upper orientation control layer 40 are magnetically coupled to each other by the lower orientation control layer 30. This magnetic coupling is called "RKKY interaction." The magnetic coupling between the two soft magnetic material layers (the underlayer 20 and the upper orientation control layer 40) depends on the film thickness of the non-magnetic material layer (the lower orientation control layer 30) lying therebetween, and changes periodically between ferromagnetic coupling and antiferromagnetic coupling. In the present invention, it is preferred that a magnetic flux caused by the magnetization of the soft magnetic material be circulated in the underlayer 20 and the upper orientation control layer 40, by antiferromagnetically coupling the underlayer 20 and the upper orientation control layer 40. Consequently, the noise caused due to the soft magnetic material can be prevented, improving the electromagnetic conversion characteristics of the magnetic recording medium (i.e., preventing the reduction of the SNR and improving the overwrite properties). In order to accomplish the antiferromagnetic coupling between the underlayer 20 and the upper orientation control layer 40, it is preferred that the film thickness of the lower orientation control layer 30 be 0.3 to 0.7 nm or 1.3 to 1.7 nm.

Magnetization of the upper orientation control layer 40 can be controlled by adjusting the amount of Cr, Mo, or W to be added. The greater the magnetization of the upper orientation control layer 40, the better the overwrite properties. However, excessive magnetization of the upper orientation control layer 40 might result in an increase in noise. The amount of Cr, Mo, or W to be added in the upper orientation control layer 40 is adjusted according to desired electromagnetic conversion characteristics (read/write characteristics). It is preferred that the amount of Cr, Mo, or W to be added be approximately 5 to 20 at %, in consideration of the balances of the overwrite properties, noise, and the like.

The intermediate layer 50 functions to provide a film formation target surface suitable for forming the magnetic recording layer 60, by adjusting the crystal orientations determined by the lower orientation control layer 30 and the upper orientation control layer 40 and at the same time reducing the number of crystal defects. Normally, the intermediate layer 50 is formed using Ru or Ru alloy. In terms of the quality level of the intermediate layer 50 to be obtained, easiness of controlling the film thickness thereof, and high speed of forming the intermediate layer 50, it is preferred that the intermediate layer 50 be formed using a DC magnetron sputtering method.

The crystallinity of the intermediate layer 50 is improved by increasing the film thickness of the intermediate layer 50. However, increasing the film thickness of the intermediate layer 50 leads to enlargement of the crystal grains in the intermediate layer 50 (i.e., increase in the crystal grain diameter) and enlargement of the crystal grains in the magnetic recording layer 60 formed on the intermediate layer 50. Therefore, the film thickness of the intermediate layer 50 is determined based on the balance between the effects of the improved crystal orientations and prevention of the enlargement of the crystal grains. In order to accomplish this balance, it is generally preferred that the film thickness of the intermediate layer 50 be approximately 8 nm to 20 nm.

The magnetic recording layer 60 is a layer made of a magnetic material having an axis of easy magnetization (a c-axis of the hcp structure) oriented in the perpendicular direction of the magnetic recording medium. The magnetic material that can be used for forming the magnetic recording layer 60 contains Co alloy or, preferably, Co—Pt-based alloy containing Co and Pt. The Co—Pt-based alloy may further contain metals such as Cr, B, Ta, and W. Furthermore, the magnetic material used for forming the magnetic recording layer 60 may have a granular structure in which the magnetic crystal grains of the abovementioned Co—Pt-based alloy are separated by a non-magnetic grain boundary formed of oxide or nitride of Si, Cr, Co, Ti, or Ta (SiO2, TiO2, etc.). In terms of the quality level of the magnetic recording layer 60 to be obtained, easiness of controlling the film thickness thereof, and high speed of forming the magnetic recording layer 60, it is preferred that the magnetic recording layer 60 be formed using the DC magnetron sputtering method.

It is generally preferred that the magnetic recording layer 60 have a stacking structure formed of a plurality of layers. The stacking structure can be, for instance, a structure in which a plurality of magnetic layers having granular structures of different compositions are stacked and then Co—Pt-based alloy (e.g., CoCrPtB alloy) magnetic layer is stacked thereon. By adopting this stacking structure of a plurality of magnetic layers, not only is it possible to flexibly control the magnetic characteristics of the magnetic recording layer 60 in accordance with the characteristics of the magnetic head used for read/write processes, but also noise caused by the magnetic recording layer 60 can be prevented. In the magnetic recording layer 60 having the stacking structure, a coupling control layer (not shown) may be formed between the magnetic layers, if necessary. The coupling control layer can be formed with, for example, V, Cr, Fe, Co, Ni, Cu, Nb, Mo, Ru, Rh, Ta, W, Re, Ir, or alloy having any of these metals as the main component. The coupling control layer functions to control exchange coupling between the magnetic layers. A magnetization reversal magnetic field of the entire magnetic recording layer 60 can be adjusted by controlling the exchange coupling in the magnetic correlation between the magnetic layers to an appropriate value.

The protective layer 70, which may be provided arbitrarily, is a layer for protecting the magnetic recording layer 60 from corrosion and shock upon contact with the head. The protective layer 70 can be formed using a material that is conventionally used in the field of magnetic recording media (such as carbon based materials). Generally, the protective layer 70 is formed using diamond-like carbon (DLC). The protective layer 70 may be a single layer or have a stacking structure. The stacking structure of the protective layer 70 may be, for example, a stacking structure formed of two types of carbon based materials of different characteristics, a stacking structure formed of metal and a carbon based material, or a stacking structure formed of a metal-oxide film and carbon based material. The protective layer 70 can be formed using a plasma CVD method, a sputtering method, a vacuum deposition method, or any other methods known in the art.

The fluid lubrication layer 80, which may be provided arbitrarily, can be formed using a material that is conventionally used in the field of magnetic recording media (e.g., perfluoropolyether lubricant (Fomblin™ Z-dol, Fomblin™ Z-tetraol, etc.). The fluid lubrication layer 80 can be formed using, for example, a dip-coating method, a spin-coating method, or other coating method.

EXAMPLE 1

A surface of a doughnut-shaped aluminum disk having a 95-mm outer diameter, 25-mm inner diameter, and 1.27-mm thickness was plated with NiP to a 12 µm film thickness, to prepare the non-magnetic substrate 10. The resultant non-magnetic substrate 10 was smoothed and cleansed.

Cr50Ti50 film was deposited on the cleansed non-magnetic substrate 10 to form an adhesive layer (not shown in the FIGURE) having a film thickness of 6.0 nm, by using the DC magnetron sputtering method.

Subsequently, a $Fe_{57}Cr_{30}Zr_5Ta_8$ film having a film thickness of 10 nm, an Ru film having a film thickness of 0.8 nm, and a $Fe_{57}Cr_{30}Zr_5Ta_8$ film having a film thickness of 10 nm were stacked on the adhesive layer to form the underlayer 20 of a three-layer structure, by using the DC magnetron sputtering method.

Next, the lower orientation control layer 30 made of Ru was formed on the underlayer 20 by using the DC magnetron sputtering method. Here, samples of lower orientation control layers 30 having film thicknesses of 1.0 nm, 1.5 nm, 2.0 nm, and 2.5 nm were prepared, and then the following film formation was performed.

Thereafter, non-magnetic $Co_{66}Cr_{34}$ was deposited on each lower orientation control layer 30 to form the upper orientation control layer 40 having a film thickness of 6.0 nm, by using the DC magnetron sputtering method. Furthermore, Ru was deposited on the upper orientation control layer 40 to form the intermediate layer 50 having a film thickness of 8 nm, by using the DC magnetron sputtering method.

A $(Co_{76}Cr_6Pt_{18})_{90}$—$(TiO_2)_{10}$ film (first magnetic layer) having a film thickness of 5 nm, a $Ru_{50}Co_{50}$, film (coupling control layer) having a film thickness of 0.2 nm, a $(Co_{77}Cr_{23}Pt_{10})_{94}$—$(SiO_2)_6$ film (second magnetic layer) having a thickness of 7 nm, and a $Co_{65}Cr_5Pt_{20}B_{10}$ film (third magnetic layer) having a film thickness of 3 nm, were stacked on the intermediate layer 50 to form the magnetic recording layer 60 of a four-layer structure by using the DC magnetron sputtering method.

Then, carbon (C) was deposited on the magnetic recording layer 60 to form the protective layer 70 having a film thickness of 2 nm, by using the plasma CVD method. Further, perfluoropolyether (Fomblin™ Z-tetraol) was applied thereto to form the fluid lubrication layer 80 having a film thickness of 2 nm on the protective layer 70, by using the dip-coating method. As a result, a magnetic recording medium was obtained.

EXAMPLE 2

The procedure of Example 1 was repeated to obtain a magnetic recording medium, except that the upper orientation control layer 40 was formed using non-magnetic $Co_{70}Cr_{25}W_5$.

EXAMPLE 3

The procedure of Example 1 was repeated to obtain a magnetic recording medium, except that the upper orientation control layer 40 was formed using non-magnetic Ni75Cr20Mo5.

EXAMPLE 4

The procedure of Example 1 was repeated to obtain a magnetic recording medium, except that the upper orientation control layer 40 was formed using non-magnetic $Ni_{90}Cr_5W_5$.

EXAMPLE 5

The procedure of Example 1 was repeated to obtain a magnetic recording medium, except that the upper orientation control layer 40 was formed using soft magnetic $Co_{80}Cr_{15}Mo_5$.

EXAMPLE 6

The procedure of Example 1 was repeated to obtain a magnetic recording medium, except that the upper orientation control layer 40 was formed using soft magnetic $Ni_{75}Fe_{20}W_5$ and that the film thicknesses of the lower orientation control layers 30 were set at 0.3 nm, 0.5 nm, 0.7 nm, 0.9 nm, 1.1 nm, 1.3 nm, 1.5 nm, and 1.7 nm.

COMPARATIVE EXAMPLE 1

The procedure of Example 1 was repeated to obtain a magnetic recording medium, except that the lower orientation control layers 30 were formed using $Ni_{75}Cr_{20}Mo_5$ and that the film thicknesses of the lower orientation control layers 30 were set at 2.5 nm, 3.0 nm, 3.5 nm, and 4.0 nm.

EXAMPLE 7

The procedure of Example 2 was repeated to obtain a magnetic recording medium, except that the film thicknesses of the upper orientation control layers 40 were set at 2 nm, 4 nm, 6 nm, 8 nm, 10 nm, and 12 nm and that the film thickness of the lower orientation control layer made of Ru was set at 1.5 nm.

COMPARATIVE EXAMPLE 2

The procedure of Example 7 was repeated to obtain a magnetic recording medium, except that the upper orientation control layer 40 was not formed.

Evaluations

For each of the magnetic recording media prepared in Examples 1 to 7 and Comparative Examples 1 and 2, the average crystal grain diameter of the magnetic recording layer, crystal axis orientation dispersion of the intermediate layer, magnetic characteristics, and the electromagnetic conversion characteristics were evaluated. The crystal grain diameter of the magnetic recording layer of each magnetic recording medium was measured through plane observation (bright field image) using a transmission electron microscope (TEM). The average crystal grain diameter was obtained a number average of crystal grains in a 0.3 µm×0.3 µm bright field image. The crystal axis orientation dispersion was obtained from a peak (002) of the Ru of the intermediate layer 50 that is measured by an X-ray diffraction method (XRD, a rocking curve method). Here, the crystal axis orientation dispersion in the intermediate layer was equal to the crystal axis orientation dispersion in the magnetic recording layer. Furthermore, the SNR and overwrite (OW) values were measured as the electromagnetic conversion characteristics of each magnetic recording medium. The SNR was measured using a spin-stand tester that is equipped with a combined head having a recording single magnetic pole head and a readout GMR head. This measurement was carried out under a measurement condition equivalent to a recording density of 500 Gb/in$^2$. The SNR value was obtained from obtained signal output and noise output by using the following formula:

$$SNR(dB)=20 \times \log [(signal\ output)/(noise\ output)]$$

(where "log" represents a common logarithm.)

The OW value was evaluated using a method that includes: (1) a step of recording a first signal having a recording density of 510 kfci (kilo flux change per inch) on a track of each magnetic recording medium, to measure a signal output (T1) of the first signal; (2) a step of overwriting a second signal having a recording density of 68 kfci on the same track, to measure a signal output (T2) of the remaining components of the first signal obtained as a result of overwrite; and (3) a step of obtaining the OW value (unit: dB) by using a formula:

$$OW(dB)=20 \times \log(T2/T1).$$

The greater the negative value of the OW value, the more excellent overwrite properties the magnetic recording medium can have. In the present invention, a SNR value of 12.5 db or more and an OW value of −31 dB or less are determined as favorable characteristics.

The following Tables 1 and 2 (the latter being a continuation of Table 1) show the configurations of the lower orientation control layer 30 and the upper orientation control layer 40 of each magnetic recording medium, as well as the obtained evaluation results.

TABLE 1

| | Lower orientation control layer | | Upper orientation control layer | | Crystal axis orientation dispersion (deg.) | Average crystal grain diameter (nm) | SNR (dB) | OW (−dB) |
|---|---|---|---|---|---|---|---|---|
| | Composition | Film thickness (nm) | Composition | Film thickness (nm) | | | | |
| Example 1 | Ru | 1.00 | $Co_{66}Cr_{34}$ (non-magnetic) | 6.00 | 2.91 | 6.6 | 12.9 | 33.0 |
| | | 1.50 | | 6.00 | 2.82 | 6.7 | 13.2 | 32.8 |
| | | 2.00 | | 6.00 | 2.84 | 6.5 | 13.1 | 32.4 |
| | | 2.50 | | 6.00 | 2.87 | 6.8 | 13.1 | 31.5 |
| Example 2 | Ru | 1.00 | $Co_{70}Cr_{25}W_5$ (non-magnetic) | 6.00 | 2.83 | 6.7 | 13.1 | 33.0 |
| | | 1.50 | | 6.00 | 2.78 | 6.7 | 13.3 | 32.9 |
| | | 2.00 | | 6.00 | 2.78 | 6.9 | 13.1 | 32.8 |
| | | 2.50 | | 6.00 | 2.80 | 6.8 | 13.1 | 31.9 |
| Example 3 | Ru | 1.00 | $Ni_{75}Cr_{20}Mo_5$ (non-magnetic) | 6.00 | 2.81 | 6.8 | 12.9 | 32.7 |
| | | 1.50 | | 6.00 | 2.81 | 6.8 | 12.9 | 32.8 |
| | | 2.00 | | 6.00 | 2.85 | 7.0 | 12.9 | 32.1 |
| | | 2.50 | | 6.00 | 2.74 | 6.9 | 12.8 | 32.2 |
| Example 4 | Ru | 1.00 | $Ni_{90}Cr_5W_5$ (non-magnetic) | 6.00 | 2.80 | 6.9 | 12.7 | 32.4 |
| | | 1.50 | | 6.00 | 2.83 | 7.0 | 13.0 | 32.5 |
| | | 2.00 | | 6.00 | 2.84 | 7.0 | 12.9 | 32.1 |
| | | 2.50 | | 6.00 | 2.85 | 7.0 | 12.9 | 31.9 |
| Example 5 | Ru | 1.00 | $Co_{80}Cr_{15}Mo_5$ (soft magnetic) | 6.00 | 2.84 | 7.0 | 12.6 | 34.7 |
| | | 1.50 | | 6.00 | 2.82 | 7.0 | 13.1 | 34.6 |
| | | 2.00 | | 6.00 | 2.84 | 6.9 | 12.7 | 33.2 |
| | | 2.50 | | 6.00 | 2.81 | 7.1 | 12.5 | 34.4 |
| Comparative Example 1 | $Ni_{75}Cr_{20}Mo_5$ | 2.50 | $Co_{66}Cr_{34}$ (non-magnetic) | 6.00 | 2.90 | 7.5 | 12.2 | 33.1 |
| | | 3.00 | | 6.00 | 2.88 | 7.7 | 12.3 | 32.2 |
| | | 3.50 | | 6.00 | 2.89 | 7.7 | 12.4 | 32.0 |
| | | 4.00 | | 6.00 | 2.86 | 8.0 | 12.4 | 31.6 |

TABLE 2

| | Lower orientation control layer | | Upper orientation control layer | | Crystal axis orientation dispersion (deg.) | Average crystal grain diameter (nm) | SNR (dB) | OW (−dB) |
|---|---|---|---|---|---|---|---|---|
| | Composition | Film thickness (nm) | Composition | Film thickness (nm) | | | | |
| Example 6 | Ru | 0.30 | $Ni_{75}Fe_{20}W_5$ (soft magnetic) | 6.00 | 2.81 | 6.8 | 13.2 | 34.2 |
| | | 0.50 | | 6.00 | 2.78 | 6.7 | 13.4 | 34.4 |
| | | 0.70 | | 6.00 | 2.82 | 6.7 | 13.0 | 34.1 |
| | | 0.90 | | 6.00 | 2.81 | 6.9 | 12.6 | 34.3 |
| | | 1.10 | | 6.00 | 2.78 | 6.7 | 12.9 | 34.5 |
| | | 1.30 | | 6.00 | 2.79 | 6.9 | 13.3 | 34.1 |
| | | 1.50 | | 6.00 | 2.77 | 6.8 | 13.1 | 34.3 |
| | | 1.70 | | 6.00 | 2.80 | 6.8 | 12.5 | 34.3 |
| Comparative Example 1 | $Ni_{75}Cr_{20}Mo_5$ | 2.50 | $Co_{66}Cr_{34}$ (non-magnetic) | 6.00 | 2.90 | 7.5 | 12.2 | 33.1 |
| | | 3.00 | | 6.00 | 2.88 | 7.7 | 12.3 | 32.2 |
| | | 3.50 | | 6.00 | 2.89 | 7.7 | 12.4 | 32.0 |
| | | 4.00 | | 6.00 | 2.86 | 8.0 | 12.4 | 31.6 |
| Example 7 | Ru | 1.50 | $Co_{70}Cr_{25}W_5$ (non-magnetic) | 2.00 | 3.11 | 6.7 | 12.6 | 33.4 |
| | | 1.50 | | 4.00 | 2.81 | 6.8 | 12.8 | 33.0 |
| | | 1.50 | | 6.00 | 2.78 | 6.7 | 13.3 | 32.9 |
| | | 1.50 | | 8.00 | 2.75 | 6.9 | 13.2 | 31.9 |
| | | 1.50 | | 10.00 | 2.75 | 7.0 | 13.2 | 31.6 |
| | | 1.50 | | 12.00 | 2.76 | 7.0 | 13.1 | 31.0 |
| Comparative Example 2 | Ru | 1.50 | — | 0.00 | 3.31 | 6.5 | 10.5 | 29.0 |

The magnetic recording media of Examples 1 to 6 have the crystal axis orientation dispersion values equal to or lower than that of the magnetic recording medium of Comparative Example 1 (i.e., equal to or higher orientation characteristics), and the average crystal grain diameters of the magnetic recording layers that are smaller than that of the magnetic recording medium of Comparative Example 1 by approximately 10%. This indicates that the lower orientation control layers 30 made of Ru have excellent crystal axis orientation dispersion reduction effects and crystal grain enlargement prevention effects. Moreover, as the average crystal grain diameters of the magnetic recording layers decrease, the magnetic recording media of Examples 1 to 6 produce larger SNR values and larger negative OW values than the magnetic recording medium of Comparative Example 1. This indicates that the magnetic recording media of Examples 1 to 6 have excellent electromagnetic conversion characteristics.

In addition, when comparing Example 7 with Comparative Example 2, the magnetic recording medium of Example 7 has a lower crystal axis orientation dispersion value (i.e., excellent orientation characteristics) than the magnetic recording medium of Comparative Example 2, meaning that the upper orientation control layer 40 of Example 7 contributes to improvement of the orientation characteristics.

Further, in Example 7, the SNR value and the OW value increase as the film thickness of the upper orientation control layer 40 increases (i.e., the overwrite properties drop). It is clear from Example 7 that a favorable balance between the SNR value and the OW value can be realized when the film thickness of the upper orientation control layer 40 is approximately 2 to 8 nm.

When Examples 5 and 6, each of which has the upper orientation control layer 40 made of the soft magnetic material, are compared with Examples 1 to 4, Example 7, and Comparative Example 1, each of which has the upper orientation control layer 40 made of the non-magnetic material, the magnetic recording media of Examples 5 and 6 have larger negative OW values and excellent overwrite properties. It is clear that, in Example 6, the SNR value increases as the film thickness of the lower orientation control layer 30 decreases. This means that the electromagnetic conversion characteristics of each of the magnetic recording media can be improved by setting the film thickness of the lower orientation control layer 30 at an appropriate value.

Further, in Example 7, the SNR value and the OW value increase as the film thickness of the upper orientation control layer 40 increases (i.e., the overwrite properties drop). It is clear from Example 7 that a favorable balance between the SNR value and the OW value can be realized when the film thickness of the upper orientation control layer 40 is approximately 2 to 8 nm.

When Examples 5 and 6, each of which has the upper orientation control layer 40 made of the soft magnetic material, are compared with Examples 1 to 4, Example 7, and Comparative Example 1, each of which has the upper orientation control layer 40 made of the non-magnetic material, the magnetic recording media of Examples 5 and 6 have larger negative OW values and excellent overwrite properties. It is clear that, in Example 6, the SNR value increases as the film thickness of the lower orientation control layer 30 decreases. This means that the electromagnetic conversion characteristics of each of the magnetic recording media can be improved by setting the film thickness of the lower orientation control layer 30 at an appropriate value.

Thus, a perpendicular recording medium has been described according to the present invention. Many modifications and variations may be made to the techniques and structures described and illustrated herein without departing from the spirit and scope of the invention. Accordingly, it should be understood that the devices and methods described herein are illustrative only and are not limiting upon the scope of the invention.

What is claimed is:

1. A perpendicular magnetic recording medium comprising:
a non-magnetic substrate,
an underlayer comprising an alloy made from a magnetic metal selected from the group consisting of Co, Fe, and Ni, and an element having high amorphous structure organization potency selected from the group consisting of Zr, Ta, Nb, Ti, Mo, W, Si and B,
a lower orientation control layer, arranged directly on the underlayer, made of Ru or Ru alloy, and having an hcp structure,
an upper orientation control layer, arranged directly on the lower orientation control layer, made of an alloy that contains one element selected from the group consisting of Co and Ni and an element selected from the group consisting of W and Mo, and having an fcc or hcp structure,
an intermediate layer, arranged directly on the upper orientation control layer, made of non-alloyed Ru and having a thickness of 8 nm to 20 nm, and
a magnetic recording layer arranged directly on the intermediate layer,
wherein the layers are stacked sequentially on the non-magnetic substrate and wherein the underlayer has either (i) an amorphous single-layer structure or (ii) a stacking structure configured by a plurality of layers in which at least a layer that is in contact with the lower orientation control layer on the non-magnetic substrate side is amorphous.

2. The perpendicular magnetic recording medium according to claim 1, wherein the lower orientation control layer has a film thickness of 0.3 nm to 2.5 nm, and the upper orientation control layer has a film thickness of 2.0 nm to 12.0 nm.

3. The perpendicular magnetic recording medium according to claim 1, wherein the underlayer and the upper orientation control layer are soft magnetic layers and are magnetically coupled to each other by the lower orientation control layer.

4. The perpendicular magnetic recording medium according to claim 2, wherein the underlayer and the upper orientation control layer are soft magnetic layers and are magnetically coupled to each other by the lower orientation control layer.

5. The perpendicular magnetic recording medium according to claim 1, wherein the magnetic recording layer is made of Co alloy.

6. The perpendicular magnetic recording medium according to claim 2, wherein the magnetic recording layer is made of Co alloy.

7. The perpendicular magnetic recording medium according to claim 3, wherein the magnetic recording layer is made of Co alloy.

8. The perpendicular magnetic recording medium according to claim 4, wherein the magnetic recording layer is made of Co alloy.

9. A perpendicular magnetic recording medium comprising:
a non-magnetic substrate,
an underlayer comprising an alloy made from a magnetic metal selected from the group consisting of Co, Fe, and Ni, and an element having high amorphous structure organization potency selected from the group consisting of Zr, Ta, Nb, Ti, Mo, W, Si and B,
a lower orientation control layer made of Ru or Ru alloy, and having an hcp structure,
an upper orientation control layer made of an alloy that contains one element selected from the group consisting of Co and Ni and Mo, and having an fcc or hcp structure,
an intermediate layer of Ru or Ru alloy, and
a magnetic recording layer,
wherein the layers are stacked sequentially on the non-magnetic substrate and wherein the underlayer has either (i) an amorphous single-layer structure or (ii) a stacking structure configured by a plurality of layers in which at least a layer that is in contact with the lower orientation control layer on the non-magnetic substrate side is amorphous.

10. The perpendicular magnetic recording medium according to claim 9, wherein the lower orientation control layer is arranged directly on the underlayer, the upper orientation control layer is arranged directly on the lower orientation control layer, the intermediate layer is arranged directly on the upper orientation control layer, and the magnetic recording layer is arranged directly on the intermediate layer.

11. The perpendicular magnetic recording medium according to claim 9, wherein the intermediate layer has a film thickness of 8 nm to 20 nm.

12. The perpendicular magnetic recording medium according to claim 9, wherein the intermediate layer is made of non-alloyed Ru.

13. The perpendicular magnetic recording medium according to claim 9, wherein the alloy of the upper orientation control layer contains Co and Mo.

14. The perpendicular magnetic recording medium according to claim 9, wherein the alloy of the upper orientation control layer contains Ni and Mo.

15. The perpendicular magnetic recording medium according to claim 9, wherein the lower orientation control layer has a film thickness of 0.3 nm to 2.5 nm, and the upper orientation control layer has a film thickness of 2.0 nm to 12.0 nm.

16. The perpendicular magnetic recording medium according to claim 9, wherein the underlayer and the upper orientation control layer are soft magnetic layers and are magnetically coupled to each other by the lower orientation control layer.

* * * * *